United States Patent [19]
Sakonjyu et al.

[11] Patent Number: 5,749,063
[45] Date of Patent: *May 5, 1998

[54] AUTOMATIC VEHICLE SPEED CONTROLLING APPARATUS

[75] Inventors: Kazutaka Sakonjyu; Eisaku Hori, both of Yokohama, Japan

[73] Assignee: Jidosha Denki Kogyo Kabushiki Kaisha, Yokohama, Japan

[*] Notice: The term of this patent shall not extend beyond the expiration date of Pat. No. 5,434,786.

[21] Appl. No.: 149,741

[22] Filed: Nov. 10, 1993

[30] Foreign Application Priority Data

Nov. 11, 1992 [JP] Japan ................... 4-301195

[51] Int. Cl.$^6$ ................................ G06G 7/70
[52] U.S. Cl. .................. 701/93; 701/96; 701/110; 701/70; 180/179; 180/178; 180/171; 123/350; 123/352; 364/164
[58] Field of Search .................. 364/426.04, 431.07, 364/565, 424.01; 123/352, 350, 361, 399, 339.16, 378; 180/179, 178, 171, 176, 170; 477/110, 98, 111, 170, 183, 108, 42, 43; 395/900, 905, 3, 11

[56] References Cited

U.S. PATENT DOCUMENTS

| | | | |
|---|---|---|---|
| 4,374,422 | 2/1983 | O'Keefe, Jr. et al. | 364/426.041 |
| 4,419,729 | 12/1983 | Krieder | 364/426.041 |
| 4,535,865 | 8/1985 | Tanigawa et al. | 180/177 |
| 4,725,969 | 2/1988 | Onogi et al. | 364/426.04 |
| 4,809,175 | 2/1989 | Hosaka et al. | 364/426.04 |
| 4,814,991 | 3/1989 | Tada et al. | 364/426.04 |
| 4,829,437 | 5/1989 | Suzuki et al. | 364/426.04 |
| 4,835,696 | 5/1989 | Suzuki et al. | 364/426.04 |
| 4,870,583 | 9/1989 | Takahashi et al. | 364/426.041 |
| 4,926,334 | 5/1990 | Suzuki et al. | 364/426.04 |
| 4,969,531 | 11/1990 | Hirakata et al. | 364/426.04 |
| 5,003,482 | 3/1991 | Teratani et al. | 364/426.04 |
| 5,012,419 | 4/1991 | Yamamoto | 364/426.04 |
| 5,036,936 | 8/1991 | Kawano et al. | 364/426.04 |
| 5,051,905 | 9/1991 | Yoshida | 364/424.1 |
| 5,121,323 | 6/1992 | Yamamoto et al. | 364/426.04 |
| 5,127,487 | 7/1992 | Yamamoto et al. | 180/179 |
| 5,154,250 | 10/1992 | Murai | 180/179 |
| 5,189,618 | 2/1993 | Tsujii et al. | 364/426.04 |
| 5,197,564 | 3/1993 | Nishimura et al. | 180/179 |
| 5,251,138 | 10/1993 | Katayama | 364/426.04 |
| 5,270,934 | 12/1993 | Kobayashi | 364/426.04 |
| 5,434,786 | 7/1995 | Sakonjyu et al. | 364/426.041 |
| 5,508,925 | 4/1996 | Katayama et al. | 364/426.04 |

*Primary Examiner*—Jacques H. Louis-Jacques
*Attorney, Agent, or Firm*—Sughrue, Mion, Zinn, Macpeak & Seas, PLLC

[57] ABSTRACT

An automatic vehicle speed controlling apparatus for a vehicle includes a vehicle speed sensor for sensing the actual speed of the vehicle and providing actual speed data proportional to the actual speed of the vehicle, a command switch operable for generating a cruise command signal and an actuator for driving a throttle valve with the vehicle. The control unit is responsive to the actual speed data and the cruise command signal and includes storage memory for storing a desired speed datum in response to the cruise command signal. The control unit selectively generates a speed increasing signal and a speed decreasing signal in response to a difference between the actual speed data and the desired speed datum stored in the memory and supplying the speed increasing signal and the speed decreasing signal to the actuator. The control unit continues generating the speed increasing signal and successively generates the speed decreasing signal when the difference between the actual speed data and the desired speed datum reaches a first predetermined value while the vehicle is accelerated with the speed increasing signal. The control unit further detects the acceleration value of the vehicle derived from the change rate of the actual speed data supplied from the vehicle speed sensor and generates the speed decreasing signal when the difference between the actual speed data and the desired speed datum reaches a second predetermined value greater than the first predetermined value after the acceleration of the vehicle exceeds a predetermined acceleration value.

3 Claims, 5 Drawing Sheets

AUTOMATIC VEHICLE SPEED CONTROLLING APPARATUS

BACKGROUND OF THE INVENTION

1. Field of the Invention

The present invention relates to an automatic vehicle speed controlling which is used for automatically running an automotive vehicle at a preselected speed without any need to operate an accelerator pedal by automatically holding the traveling speed of the automotive vehicle at the preselected vehicle speed.

2. Description of the Prior Art

The Japanese Patent Application Laid-Open No. Sho 62-181925 shows an automatic constant speed running apparatus for automatically running a vehicle at a preselected vehicle speed.

FIG. 5 shows a control operation of an automatic constant speed running apparatus disclosed in the above-described publication. When a vehicle reaches an ascending sloped road during the constant speed control so that a minus deviation would occur from an actual vehicle speed relative to a memory vehicle speed which has been preselected, in order to cause the actual vehicle speed to be identical with the memory vehicle speed, the controller effects a speed increasing control to an actuator to thereby drive a throttle valve to an open side to compensate for the speed corresponding to the decrease caused by the slope.

Under this condition, immediately after the vehicle has entered a flat or descending sloped road from the ascending sloped load, the throttle valve is left at the opening side by the speed increasing control for the ascending slope road. As a result, a positive acceleration would occur in the way where the actual vehicle speed is returned back to the memory vehicle speed, and the controller works to cause the actual vehicle speed to be identical with the memory vehicle speed. Accordingly, the controller effects a speed decreasing control to the actuator at a speed increasing/decreasing control switching point TO to drive the throttle valve to a closing position to be returned back to the opening degree kept for the flat road.

In the above-described conventional control method for the automatic constant speed apparatus, where the vehicle runs from the ascending sloped road to the flat road or the descending sloped road, the throttle valve is driven and left at the opening side, and the controller recognizes the positive acceleration caused in the transit state where the actual vehicle speed is returned back to the memory vehicle speed so that the speed increasing control is switched over to the speed decreasing control at the speed increasing/decreasing control switching point TO and the actual vehicle speed is caused to follow the memory vehicle speed. However, on the flat or descending sloped road after the ascending sloped road, due to a large deviation between the opening degree of the throttle valve for the sloped road and the maintenance opening degree for the flat road, at the conventional speed increasing/decreasing control switching point which is assumed for the next flat road, the compensation for the deviation is not timely carried out and an overshoot would be generated. As a result, the running feeling would be degraded. This feeling should be improved.

SUMMARY OF THE INVENTION

An object of the present invention is to provide an automatic vehicle speed controlling apparatus which can ensure a smooth driving feeling even if the vehicle has entered into the flat road or descending sloped road from the ascending sloped road during the constant speed control.

In order to attain this and other objects, according to the present invention, there is provided driving a throttle valve; a command switch for generating a vehicle speed sensor for sensing actual speed of a vehicle, and for generating actual speed data which is proportional to the actual speed of the vehicle, command switch means operatable for generating a cruise command signal, actuator means for driving a throttle valve of the vehicle, control means responsive to the actual speed data from said vehicle speed sensor and the cruise command signal from said command switch means, and including storage means for storing a desired speed datum in response to the cruise command signal from said command switch means, and means for selectively generating a speed increasing signal and a speed decreasing signal in response to a difference between the actual speed data from said vehicle speed sensor and the desired speed datum stored in said storage means and for supplying the speed increasing signal and the speed decreasing signal to said actuator means, wherein said means for selectively generating the speed increasing and the speed decreasing signals discontinues generating of the speed increasing signal and successively generates the speed decreasing signal when the difference between the actual speed data from said vehicle speed sensor and the desired speed datum stored in said storage means reaches a first predetermined value while the vehicle is accelerated with the speed increasing signal, wherein said control means further includes means for detecting the acceleration value of the vehicle derived from change rate of the actual speed data supplied from said vehicle speed sensor, wherein said control means generates the speed decreasing signal when the difference between the actual speed data supplied form said vehicle speed sensor and the desired speed datum stored in said storage means reaches a second predetermined value greater than the first predetermined value after the acceleration of the vehicle detected with said detecting means exceeds a predetermined acceleration value.

In accordance with the automatic vehicle speed controlling apparatus, when the vehicle speed data obtained from the vehicle speed sensor fall within the vehicle speed range less than the memory vehicle speed and the acceleration at this time exceeds a predetermined level, it is recognized that the ascending cruise is finished and the switching point at which the speed increasing control is changed to the speed decreasing control to the actuator. Further in order to enhance the speed decreasing effect, the output for the speed decreasing control after the switching point is amplified. When the amplification control is effected or the timer count is completed after the speed decreasing control in accordance with the amplified output, the amplification of the speed decreasing control is interrupted to return the output for the speed decreasing control to the normal level to thereby carry out the constant speed running.

DESCRIPTION OF THE PREFERRED EMBODIMENTS

An automatic vehicle speed controlling apparatus according to one embodiment of the invention will now be described with reference to FIGS. 1 to 3.

Figure 1:
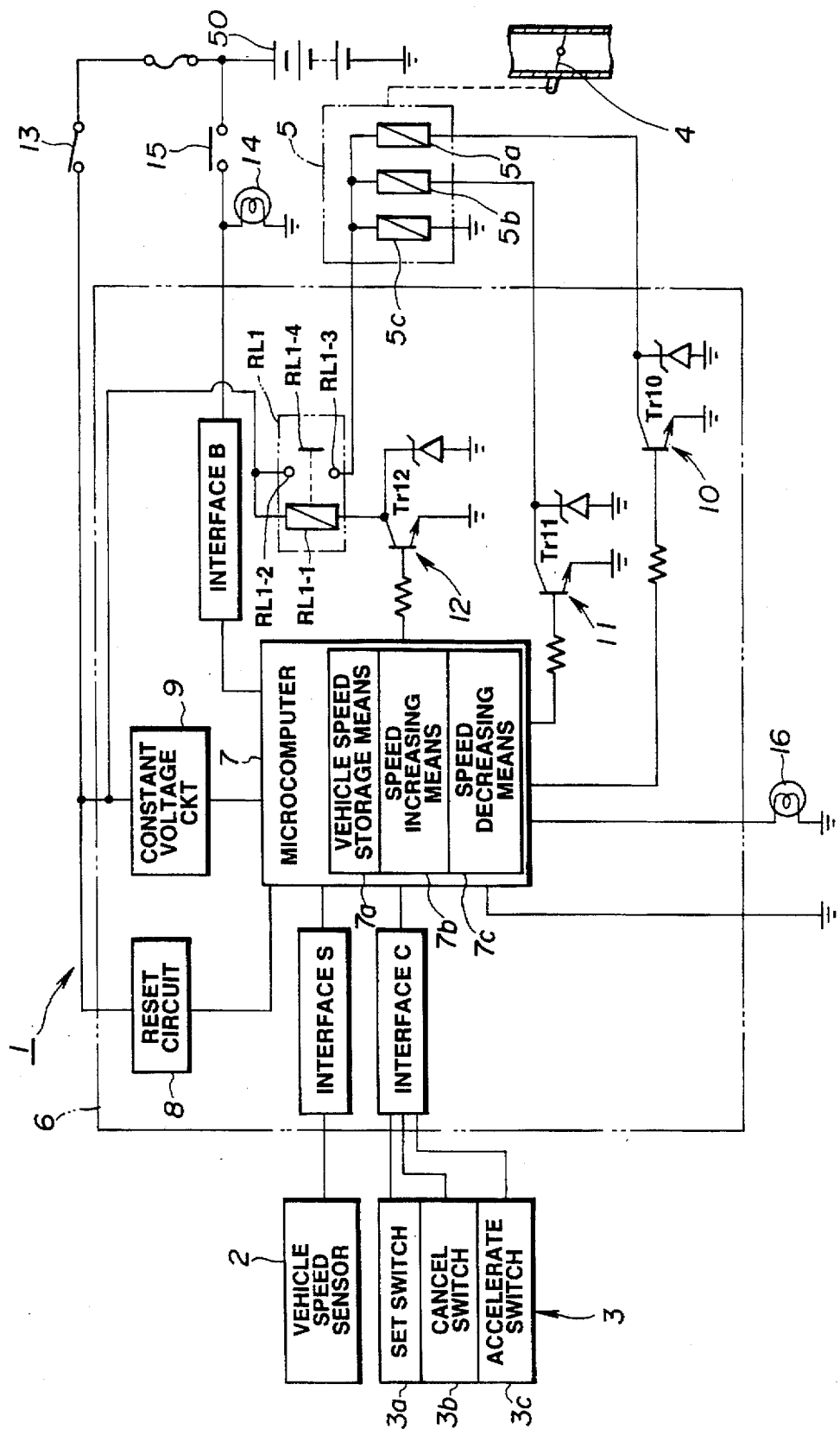
FIG. 1 is a circuit diagram showing an automatic constant speed running apparatus for illustrating a control method in accordance with one embodiment of the invention.
Figure 2:
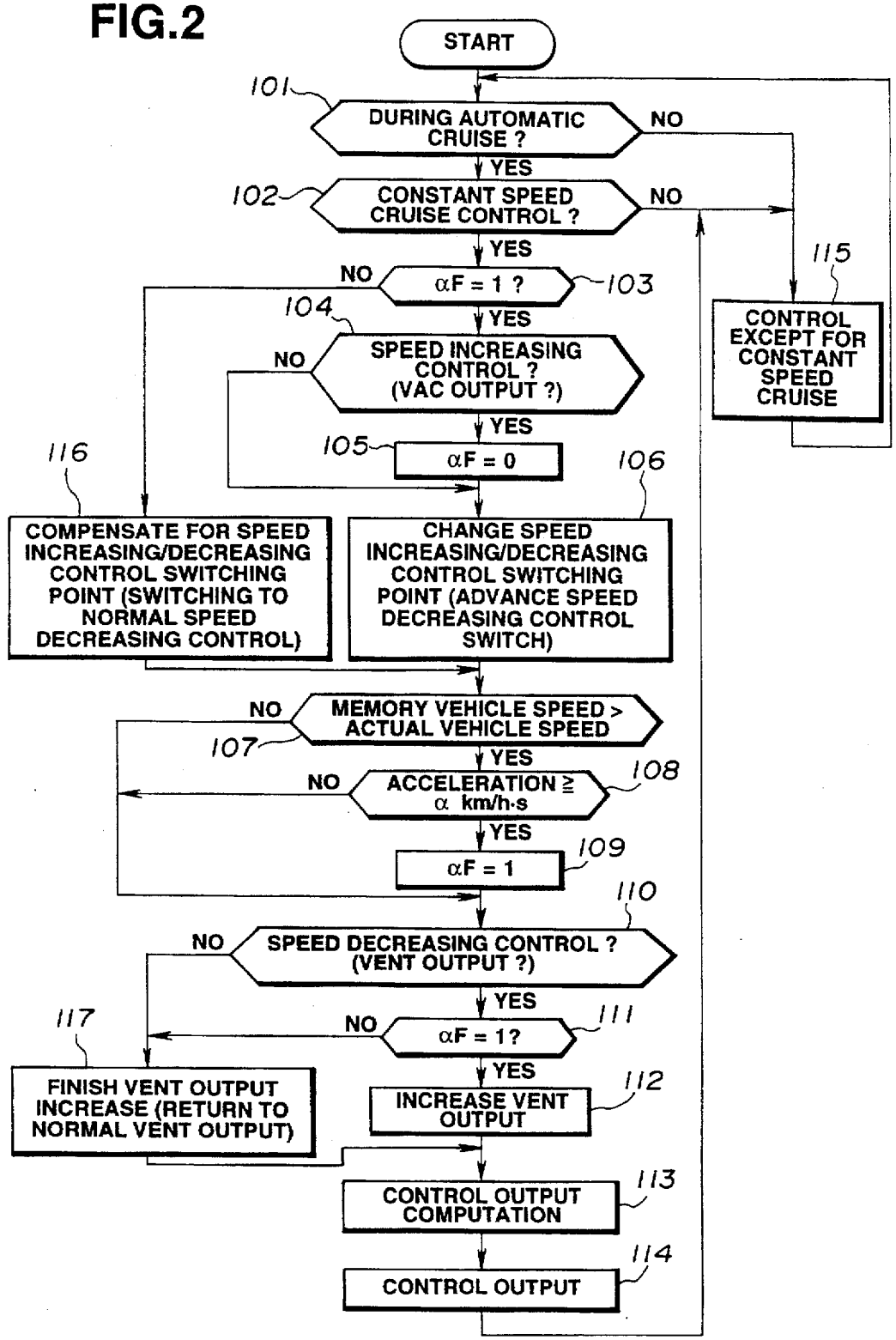
FIG. 2 is a flowchart for illustrating the control operation according to the control method for the automatic constant speed running apparatus shown in FIG. 1.
Figure 3:
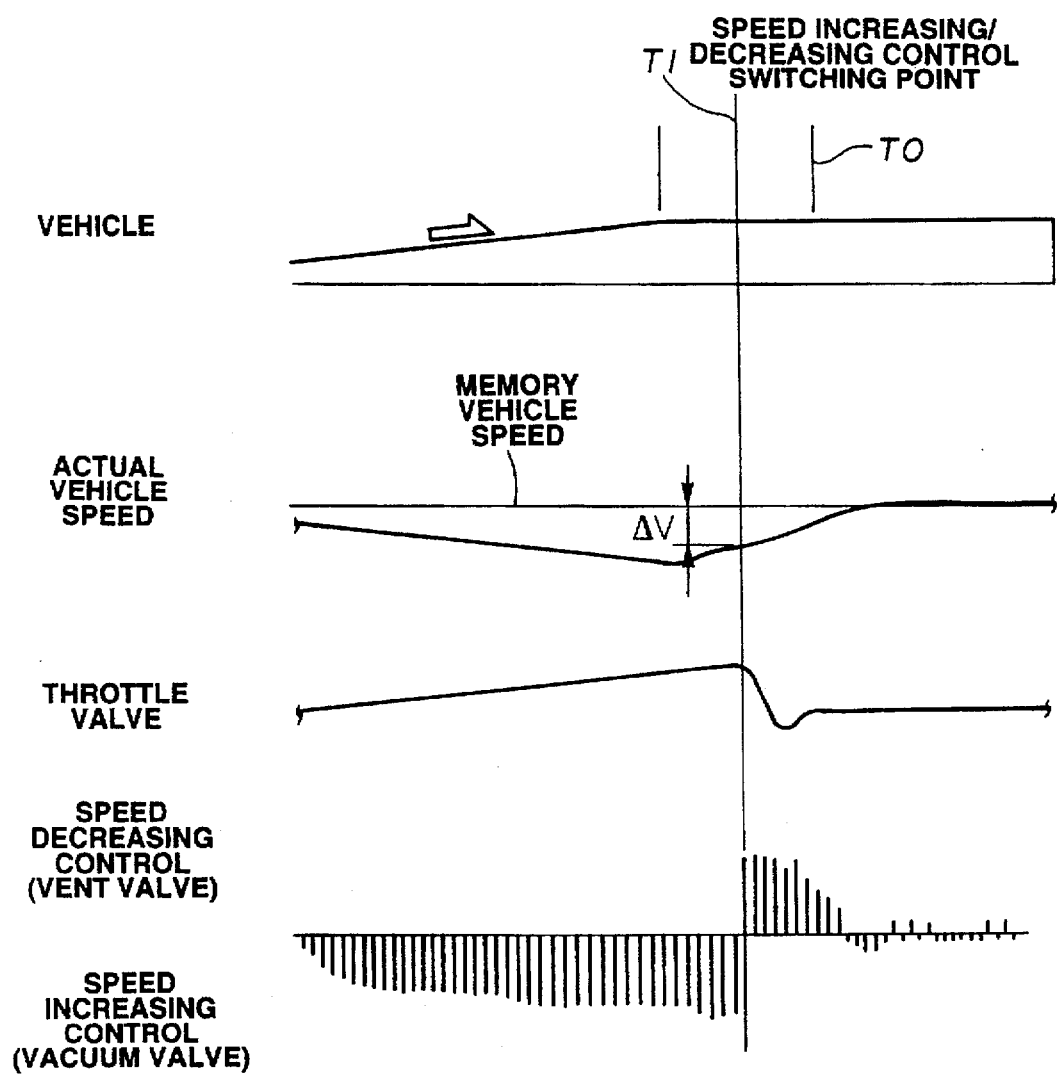
FIG. 3 is an illustration of a concept of the control method for the automatic constant speed running apparatus shown in FIG. 1.

FIG. 1 is a circuit diagram, FIG. 2 is a flowchart for illustrating a control operation and FIG. 3 is an illustration of a concept of the control.

The automatic constant speed running apparatus 1 shown in FIG. 1 is composed mainly of a vehicle speed sensor 2, a command switch 3 having a set switch 3a, a cancel switch 3b and an accelerate switch 3c, an actuator 5 connected to a throttle valve 4, and a control unit 6 for processing information from the vehicle speed sensor 2 and the command switch 3 to control the actuator 5. The control unit 6 is provided with a microcomputer 7.

The vehicle speed sensor 2 is incorporated into a speedometer (not shown) for always generating vehicle speed data in proportion to the actual vehicle speed in the form of pulse signals. The vehicle speed data from the vehicle speed sensor 2 are transferred to the microcomputer 7 through an interface S provided in the control unit 6.

Then the set switch 3a provided in the command switch 3 is actuated by the driver from an on-operation to an off-operation, a cruise command signal is generated, and the cruise command signal is transferred to the microcomputer 7 through an interface C provided in the control unit 6. Also, when the set switch 3a is turned on for a predetermined period of time or more, a speed decreasing command signal is generated. The speed decreasing command signal is transferred to the microcomputer 7 through the interface C.

Then the cancel switch 3b provided in the command switch 3 is turned on by the driver, a cancel command signal is generated and is transferred from the cancel switch 3b to the microcomputer 7 through the interface C.

Then the accelerate switch 3c provided in the command switch 3 is turned on by the driver, an accelerate command signal is generated corresponding to a period of time when the accelerate switch 3c is kept turned on. The accelerate command signal is transferred to the microcomputer 7 through the interface C. Also, after the release of the system by operating a brake pedal or switching over to a parking position or a neutral position of an automatic transmission, when the accelerate switch 3c is turned on by the driver, the accelerate switch 3c has a function to recall the memory vehicle speed before the release of the system.

The control unit 6 is provided with the above-described microcomputer 7, a reset circuit 8, a constant voltage circuit 9, an interface B, a relay RL1, vent valve switching section 10, a vacuum valve switching section 11, and an actuator power source switching section 12.

The reset switch 8 and the constant voltage circuit 9 are connected at one side to a power source 50 through a main switch 13 and at the other side to the microcomputer 7.

The interface B is connected at one side to the power source 50 through a brake lamp 14 and a brake switch 15 and at the other side to the microcomputer 7.

With respect to the relay RL1, a relay coil RL1-1 is connected at one side to one end of the constant voltage circuit 9 through a fixed contact point RL1-2 and at the other side to a collector of a transistor Tr12 of the actuator power source switching section 12. The other fixed contact point RL1-3 of the relay RL1 is connected to one side ends of a vent valve 5a, a vacuum valve 5b and a safety valve 5c provided in the actuator 5.

The relay RL1 operates a movable point RL1-4 to connect the fixed contacts RL1-2 and RL1-3 with each other when the relay coil RL1-1 is excited.

Connected to the microcomputer 7 are the interfaces S, C and B, the other sides of the reset circuit 8 and the constant voltage circuit 9, a base of a transistor Tr10 provided in the vent valve switching section 10, a base of a transistor Tr11 provided in the vacuum valve switching section 11, a base of a transistor Tr12 provided in the safety valve switching section 12, a cruise lamp 16 and the ground.

The microcomputer 7 is provided with a vehicle speed storage means 7a. When the set switch 3a is turned off after the set switch 3a has been turned on under the condition that the main switch 13 is switched on, the vehicle speed storage means 7a stores, in the speed set range, the vehicle speed data that have been transferred from the vehicle speed sensor 2 when the set switch 3a is turned off, and the microcomputer 7 sets the memory vehicle speed. When the set switch 3a of the command switch 3 has been turned on for a constant period of time or longer and the speed decreasing command signal is issued, the memory vehicle speed is renewed by the vehicle speed data that have been transferred from the vehicle speed sensor 2 when the set switch 3a is turned off. Also, when the accelerate command signal is issued while the accelerate switch 3c of the command switch 3 is being turned on, the memory vehicle speed is renewed by the vehicle speed data that have been transferred from the vehicle speed sensor when the accelerate switch 3c is turned off.

Then the cruise command signal is transferred by the set switch 3c of the command switch 3,. the microcomputer 7 calculates a deviation between the memory vehicle speed of the vehicle speed storage means 7a and the vehicle speed data transferred from the vehicle speed sensor 2. The vehicle speed data transferred from the vehicle speed sensor 2 are stored in the vehicle speed storage means 7a and the change rate for a constant period of time is calculated to obtain an acceleration. A predetermined arithmetic computation is carried out by using the memory vehicle speed and the acceleration and the deviation of the vehicle speed data transferred from the vehicle speed sensor 2. If this calculation result is negative, the speed increasing means 7b is operated for a period of time corresponding to the negative result, whereas if the calculation result is positive, the speed decreasing means 7c is operated for a period of time corresponding to the positive result.

Then the speed increasing means 7b of the microcomputer 7 is operated, the transistor Tr12 of the actuator power source switching section 12 is turned on and at the same time, the transistor Tr10 of the vent valve switching section 10 and the transistor Tr11 of the vacuum valve switching section 11 are turned on.

Then the speed decreasing means 7c of the microcomputer 7 is operated, the transistor Tr12 of the actuator power source switching section 12 is turned off and at the same time, the transistor Tr10 of the vent valve switching section 10 and the transistor Tr11 of the vacuum valve switching section 11 are turned off.

Also, when the cruise command signal is transferred by the set switch 3a of the command switch 3 to the microcomputer 7, the microcomputer 7 sets the speed increasing/ decreasing switching point TO at which the speed increasing means 7b and the speed decreasing means 7c are switched over in accordance with the calculation result predetermined between the deviation between the vehicle speed data transferred from the vehicle speed sensor 2 and the memory vehicle speed and the acceleration obtained by the change rate for the constant period of time of the vehicle speed data. The speed increasing/decreasing control switching point TO is selected as the time when the actual vehicle speed attains a value lower than the memory vehicle speed by a predetermined vehicle speed different ΔVo.

Speed difference ΔV between the memory vehicle speed and the actual vehicle speed at the speed increasing/ decreasing control switching point T1 is larger than the speed difference ΔVo at the speed increasing/decreasing control switching point T0. Namely, the speed increasing/ decreasing control switching point T1 is set in a condition in which the speed difference ΔV between the memory vehicle speed and the actual vehicle speed is larger than the speed difference ΔVo at the speed increasing/decreasing control switching point TO.

When the vehicle speed data transferred from the vehicle speed sensor 2 fall within a predetermined range of the vehicle speed which is not greater than the memory vehicle speed by the vehicle speed storage means 7a and the value of acceleration at that time is greater than a predetermined value a km/hour·sec (α:constant, hour·sec=3600 sec$^2$), the microcomputer 7 resets the speed increasing/decreasing point to a new speed increasing/decreasing control switching point T1 which is set at a point much lower than the speed increasing/decreasing control switching point TO at which the speed increasing control through the speed increasing means 7b is switched over to the speed decreasing control through the speed decreasing means 7c. Thus, the microcomputer 7 carries out the speed decreasing control through the speed decreasing means 7c.

At the same time, the microcomputer 7 amplifies the output of the speed decreasing control by the speed decreasing means 7c. The amplification of the output of the speed decreasing control by the speed decreasing means 7c is effected by an address conversion within the microcomputer 7, and the output of the speed decreasing control is amplified so that the speed decreasing means 7c is operated for a period of time longer than usual.

Also, when the predetermined calculation result obtained from the memory vehicle speed of the vehicle speed storage means 7a and the deviation and the acceleration from the vehicle speed data obtained from the vehicle sensor is negative and the speed increasing means 7b is operated after the speed decreasing control has been carried out in accordance with the microcomputer 7 interrupts the amplification of the speed decreasing means 7c back to the normal value and at the same time returns the reset of the speed increasing/decreasing control switching point T1 back to the normal condition.

On the other hand, the vent valve 5a and the safety valve 5c provided in the actuator 5 are released to the atmosphere on one side and in communication with a vacuum chamber (not shown) on the other side. If a vacuum level of the vacuum chamber would be enhanced, the throttle valve 4 is driven toward the opening side. When the vacuum level of the vacuum chamber would be lowered, the throttle valve 4 is not driven toward the open side and the throttle valve 4 is returned to the closing side by a return spring (not shown).

Also, the vacuum valve 5b provided in the actuator 5 is connected at one side in fluid communication with an intake manifold (vacuum pressure generating source) of the engine and is in fluid communication with the negative pressure at the other side.

The actuator 5 enhances the vacuum level of the vacuum pressure by turning on the vent valve 5a, the safety valve 5c and the vacuum valve 5b and lowers the vacuum level of the vacuum pressure by turning off the vent valve 5a, the safety valve 5c and the vacuum valve 5b.

The automatic constant speed running apparatus with such an arrangement performs the control based upon the control method shown in FIGS. 2 and 3.

When the main switch 13 is switched on during the travel of the vehicle, the microcomputer 7 of the control unit 6 is kept under a ready condition, and the vehicle data are orderly transferred from the vehicle speed sensor 2.

Then, when the set switch 3a of the command switch 3 is turned off after the set switch 3a has been turned on, the control is commenced. The vehicle speed storage means 7a stores the vehicle data obtained during the off-operation of the set switch 3a in accordance with the cruise command signal from the set switch 3a. The deviation of the vehicle speed data obtained from the vehicle speed sensor 2 relative to the memory vehicle speed stored in the vehicle speed storage means 7a is orderly arithmetically processed, and the speed increasing means 7b or the speed decreasing means 7c is operated in accordance with magnitudes of the deviation and the acceleration so that the cruise travel is attained while causing the actual vehicle speed to follow the memory vehicle speed.

Then the vehicle runs on a flat road, since the judgement as to whether or not the automatic running is effected is YES in step 101, the judgement as to whether or not the constant speed running control is effected is YES in step 102, and the judgement as to whether or not the α flag is present (αF=1?) is NO, the process will be advanced as follows: In step 116, the speed increasing/decreasing control switching point is determined as a normal one. In step 107, the judgement as to whether or not the vehicle speed data (actual vehicle speed) from the vehicle sensor 2 fall within the vehicle speed range determined less than the memory vehicle speed (i.e., memory vehicle speed>actual vehicle speed) is YES. In addition; in step 108, the judgement as to whether or not the value of the acceleration is greater than the predetermined level αkm/hour·sec (acceleration≧αkm/hour·sec) is NO. Then, the process skips the step 109 and takes the step 110.

Since the judgement as to whether or not the speed decreasing control is effected is NO in step 110, the process is advanced to the step 117 and step 113 where the control output is calculated. The process is advanced to the step 114 where the control signals are outputted. The process is returned back to the step 115 and step 101. The cruise travel is performed while repeating the foregoing routine.

When the set switch 3a of the command switch 3 is not turned off after it has been turned on, the judgement in the step 101 is NO. The steps 115 to the step 101 are repeated to thereby effect the control except for the constant speed running mode.

Then the vehicle reaches the ascending slope road, the minus deviation of the vehicle speed data from the vehicle speed sensor 2 relative to the memory vehicle speed is generated. Thus, the answer in step 101 is YES, the answer in step 102 is YES, the answer in step 103 is NO, the process passes through the step 116, the judgement of (memory vehicle speed>actual vehicle speed) in the step 107 is YES, in step 108, the judgement as to whether or not the value of the acceleration is greater than the predetermined level α km/hour * sec (acceleration≧αkm/hour·sec) is NO, the judgement in the step 110 as to whether the speed decreasing control is effected is NO, the process passes through the step 117, the output is calculated corresponding to the minus deviation in the step 113, the output is controlled in the step 114, the process passes through the step 115, and the process is returned back to the step 101. Thus, the speed increasing means 7b is operated to perform the speed increasing control while repeating the foregoing routine.

The speed increasing means 7b is operated so that the transistor Tr12 of the actuator power source switching section 12, the transistor Tr10 of the vent valve switching section and the transistor Tr11 of the vacuum valve switching section 11 are turned on. As a result, under the condition that the throttle valve 4 is driven toward the opening side, the cruise travel is effected while causing the actual vehicle speed to follow the memory vehicle speed.

Then the vehicle advances from the ascending sloped road to the flat road and immediately thereafter the vehicle speed data obtained from the vehicle speed sensor 2 fall within the vehicle speed range predetermined less than the memory vehicle speed with the acceleration of αkm/hour·sec or more, the answer in step 101 is YES, the answer in step 102 is YES, the answer in step 103 is NO, the process passes through the step 116, the answer in step 107 is YES, and the answer in step 108 is YES. Therefore, the process is advanced to the step 109 where an α flag is set. The process moves to the step 110. The answer in step 110 is NO. The process passes through the steps 117, 113, 114 and 115. The answer in step 101 is YES. The answer in step 102 is YES. The answer in step 103 is YES. The answer in step 104 is NO. Accordingly, in step 106, the timing of the speed increasing/decreasing control switching point is advanced to set the speed increasing/decreasing control switching point T1 whereby the speed increasing control is changed to the speed decreasing control at the speed increasing/decreasing control switching point T1 that has been advanced.

In step 107, the answer is YES. In step 108, the answer is YES. In step 109, the answer is YES. In step 110, the answer is YES. In step 111, the answer is YES. Accordingly, in step 112, the vent output is increased; that is, the output for the speed decreasing control is amplified. In step 113, the amplified control output is calculated, and in step 114, the control signal is outputted.

Thus, as is apparent from FIG. 3, the switch-over to the speed decreasing control is effected at the speed increasing/ decreasing control switching point T1 which is lower than the normal switching point T0. As a result, the transistor Tr10 of the vent valve switching section 10 of the actuator 5 is turned on for a longer period of time than usual, and the throttle valve 4 is returned in a shorter period time than usual. Accordingly, it is possible to suppress, at the minimum level, the plus deviation (i.e., overshoot) between the actual speed generated at the time when the vehicle enters from the ascending sloped road to the flat road and the memory vehicle speed.

In the step 112, the vent output is increased, and in the steps 113, 114, 115, 101, 102 and 103, the answers are YES. When the calculation result between the minus deviation of the vehicle data obtained from the vehicle speed sensor 2 relative to the memory vehicle speed and the acceleration is negative, the speed decreasing control is switched over to the speed increasing control. Accordingly, the answer in step 104 is YES, and the flag is reset in the step 105. In steps 106 and 107, the answers are YES. In steps 108 and step 110, the answers are NO. As a result, in step 117, the amplification of the vent output is interrupted and it is returned to the normal vent output. In steps 113, 114, 115, 101 and 102, the answers are YES, and in step 103, the answer is NO. In step 116, the speed increasing/decreasing control switching point Ti which has been somewhat advanced is returned to the normal speed increasing/decreasing control switching point T0.

The amplification of the speed decreasing control is interrupted in synchronism with a first speed increasing control after the speed decreasing control has been effected in accordance with the output which has been once amplified. At the same time, the switching timing for the speed increasing/decreasing control is returned back to the normal one.

Figure 4:
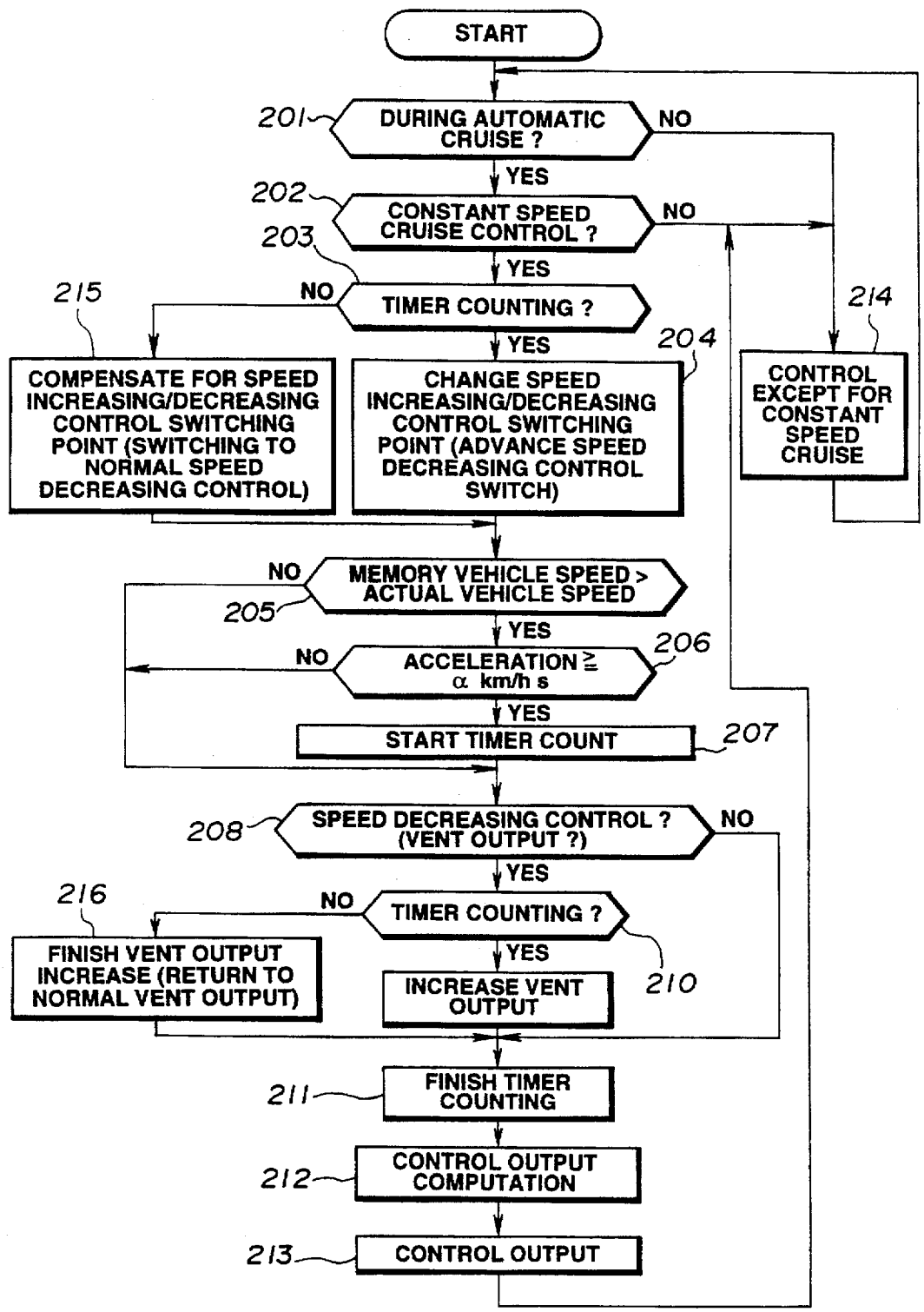
FIG. 4 is a flowchart for illustrating the control operation according to the control method according to another embodiment of the invention.
Figure 5:
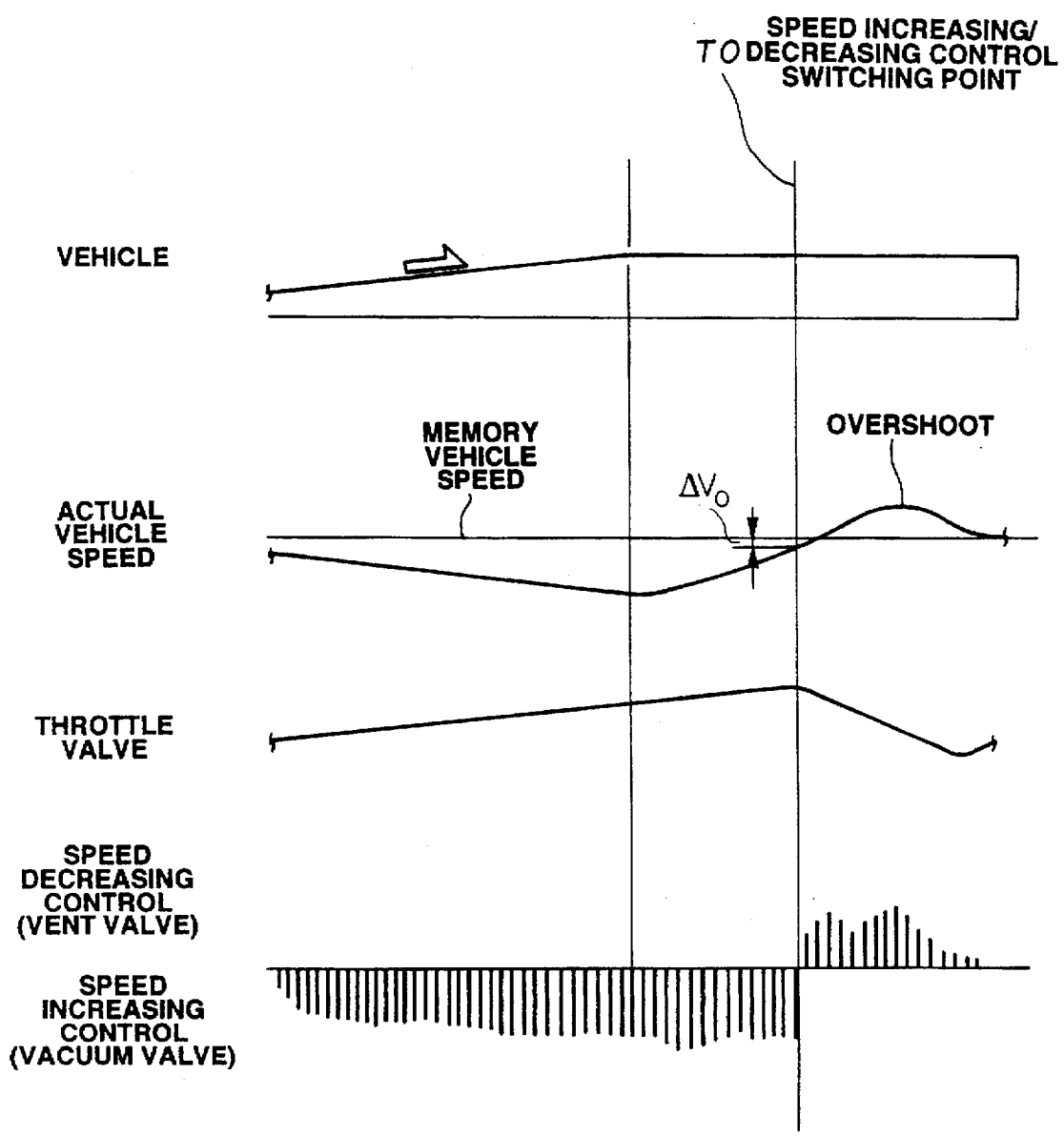
FIG. 5 is an illustration for a conventional control method for an automatic constant speed running apparatus.

FIG. 4 shows a control method for an automatic constant speed running apparatus in accordance with another embodiment of the invention.

In the control method, the earlier setting of the speed increasing/decreasing control switching point and the amplification of the output of the speed decreasing control and return of the output to the normal output are carried out by using a timer. The timer starts to count when the vehicle speed data obtained from the vehicle speed sensor 2 fall within a predetermined vehicle speed range less than the memory vehicle speed and the acceleration at this time exceeds a predetermined level. The count is incremented in every routine up to a predetermined count value at which the count is finished.

When the vehicle runs on and along the flat road, the answer in step 201 is YES, the answer in step 202 is YES, the answer in step 203 is NO, the operation in step 215 is effected, the answer in step 205 is NO, the answer in step 208 is NO, the operation in step 216 is effected, the calculation of the control output is effected in step 212, the output is fed in step 213, the control in step 214 is effected and the operation is returned to the step 201. This routine is repeatedly carried out.

When the vehicle has entered into the ascending road, the answer in step 201 is YES, the answer in step 202 is YES, the answer in step 203 is NO, the operation in step 215 is carried out, the answer in step 205 is YES, the answer in step 206 is NO, the answer in step 208 is NO, the operation in step 211 is effected, the calculation in step 212 is carried out, the operation in step 213 is effected, the operation in step 214 is effected and the operation is returned back to the step 201. This routine is repeated to carry out the speed increasing control corresponding to the minus deviation.

When the vehicle has entered from the ascending sloped road to the flat road, and immediately thereafter, the vehicle speed data obtained from the vehicle speed sensor 2 fall within a predetermined vehicle speed range less than the memory vehicle speed with the acceleration more than a km/hour·sec, the answer in step 201 is YES, the answer in step 202 is YES, the answer in step 203 is NO, the operation in step 215 is effected, the answer in step 205 is YES, and the answer in step 206 is YES. Accordingly, in step 207, the timer starts to count.

The operation in step 207 is effected, the answer in step 208 is NO, the operation in step 211 is effected, the calculation in step 212 is effected, the output in step 213 is fed, the control in step 214 is effected, the answer in step 201 is YES, the answer in step 202 is YES and the answer in step 203 is YES. Accordingly, in step 204, the timing of the speed increasing/decreasing control switching is advanced, so that the speed increasing/decreasing control switching point T1 (see FIG. 3) is set, and the speed increasing control is switched over to the speed decreasing control at the speed increasing/decreasing control switching point T1 which has been advanced.

Then, the answer in step 205 is YES, the answer in step 206 is YES, the operation in step 207 is effected, the answer in step 208 is YES, and the answer in step 209 is YES. Accordingly, in step 210, the output for the speed decreasing control, i.e., the vent output is amplified. In step 211, the timer count is finished, and in step 212, the calculation of the amplified control output is effected. In step 213, the output is fed.

Thus, in the same manner as in FIG. 3, the switching-over to the speed decreasing control is carried out at the speed increasing/decreasing control switching point T1 which is much lower than the normal switching point T0. Accordingly, it is possible to attenuate the actual vehicle speed to the memory vehicle speed in a shorter period of time from the time when the vehicle has entered from the ascending sloped road to the flat road.

In step 210, the vent output is increased. The operation in step 211 is effected, the operation in step 212 is effected, the operation in step 213 is effected, the control in step 214 is effected, the answer 201 is YES, the answer 202 is YES, the answer in step 205 is YES, the answer in step 206 is No, the answer in step 208 is YES. Accordingly, the vent output is amplified up to the completion of the timer count.

The calculation in step 212 is effected, the control output in step 213 is fed, the control in step 214 is effected, the answer in step 201 is YES, the answer in step 202 is YES, the answer in step 203 is NO. Accordingly, the speed increasing/decreasing control switching point T1 set earlier in step 215 is returned to the normal timing. In step 208, the answer is YES and in step 209, the answer is NO. Accordingly, the amplification of the vent output is interrupted, and the vent output signal is returned back to the normal condition.

Thus, in accordance with the completion of the count of the timer after the speed decreasing control has been effected, the switching timing is returned back to the normal timing for the speed increasing/decreasing control and at the same time, the amplification of the speed decreasing control is interrupted.

As described above, in the automatic vehicle speed controlling apparatus in accordance with this invention, when the vehicle speed data obtained from the vehicle speed sensor fall within the vehicle speed range less than the memory vehicle speed and the acceleration at this time exceeds a predetermined level, the point at which the speed increasing control to the actuator is switched over to the speed decreasing control is set, and at the same time, the output for the speed decreasing control after the switching point is amplified. At the same time, the control for interrupting the amplification of the speed decreasing control is effected in synchronism with the speed increasing control after the speed decreasing control by the completion of the count of the timer. Accordingly, when the vehicle has entered from the ascending sloped road to the flat road or the descending sloped road during the constant speed control, the overshoot may be suppressed to ensure a smooth running feeling.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An automatic vehicle speed controlling apparatus for a vehicle comprising:

a vehicle speed sensor for sensing actual speed of the vehicle, and for generating actual speed data which is proportional to the actual speed of the vehicle;

command switch means operable for generating a cruise command signal;

activator means for driving a throttle valve of the vehicle;

control means responsive to the actual speed data from said vehicle speed sensor and the cruise command signal from said command switch means, and including storage means for storing a desired speed datum in response to the cruise command signal from said command switch means, and means for selectively generating a speed increasing signal and a speed decreasing signal in response to a difference between the actual speed data from said vehicle speed sensor and the desired speed datum stored in said storage means and for supplying the speed increasing signal and the speed decreasing signal to said activator means;

wherein said means for selectively generating the speed increasing and the speed decreasing signals discontinues generating of the speed increasing signal and successively generates the speed decreasing signal when the difference between the actual speed data from said vehicle speed sensor and the desired speed datum stored in said storage means reaches a first predetermined value while the vehicle is accelerated with the speed increasing signal; and wherein said control means further includes means for detecting the acceleration value of the vehicle derived from change rate of the actual speed data supplied from said vehicle speed sensor;

the improvement comprising said control means generates the speed decreasing signal when the difference between the actual speed data supplied from said vehicle speed sensor and the desired speed datum stored in said storage means reaches a second predetermined value greater than the first predetermined value after the acceleration of the vehicle detected with said detecting means exceeds a predetermined acceleration value.

2. An automatic vehicle speed controlling apparatus recited in claim 1, wherein said control means further comprises means for amplifying the decreasing signal while the acceleration of the vehicle exceeds the predetermined acceleration value.

3. An automatic vehicle speed controlling apparatus received in claim 1, wherein said control means further comprises:

a timer which starts to count when the acceleration of the vehicle exceeds the predetermined acceleration value and counts up to a predetermined count value; and means for amplifying the decreasing signal until the counting value of said timer reaches the predetermined count value.

* * * * *